US005398849A

United States Patent [19]

Smith et al.

[11] Patent Number: 5,398,849

[45] Date of Patent: Mar. 21, 1995

[54] CARTRIDGE WITH SLIDE MECHANISM FOR DISPENSING TONER

[75] Inventors: Bren R. Smith, Henrietta; Donald E. Snyder, Jr., Brockport, both of N.Y.

[73] Assignee: Nu-Kote International, Rochester, N.Y.

[21] Appl. No.: 84,290

[22] Filed: Jun. 28, 1993

[51] Int. Cl.[6] .......................... G01F 11/00; B67D 3/00; G03G 15/06

[52] U.S. Cl. .................................... 222/235; 222/325; 222/486; 222/505; 222/DIG. 1; 355/260

[58] Field of Search ................. 222/325, DIG. 1, 505, 222/561, 233-235, 485, 486; 355/245, 260

[56] References Cited

U.S. PATENT DOCUMENTS

| | | | |
|---|---|---|---|
| 2,200,773 | 5/1940 | Finne | 222/486 X |
| 2,634,029 | 4/1953 | Juzwiak | 222/505 X |
| 2,792,970 | 5/1957 | Gaiman | 222/505 X |
| 3,224,031 | 12/1965 | Leland . | |
| 3,240,401 | 3/1966 | Kirschmann | 222/486 X |
| 3,339,807 | 9/1967 | Eichorn . | |
| 3,618,826 | 11/1971 | Kangas . | |
| 4,027,788 | 6/1977 | Parker et al. | 222/486 X |
| 4,061,083 | 12/1977 | Caliva . | |
| 4,135,642 | 1/1979 | Forward et al. . | |
| 4,625,895 | 12/1986 | Tsukano . | |
| 4,688,926 | 8/1987 | Manno . | |
| 4,739,907 | 4/1988 | Gallant | 222/DIG. 1 X |
| 4,943,830 | 7/1990 | Sulenski | 222/DIG. 1 X |
| 5,118,013 | 6/1992 | Mutou et al. . | |
| 5,235,389 | 8/1993 | Kikuchi et al. | 222/DIG. 1 |
| 5,257,077 | 10/1993 | Peters, Jr. et al. | 222/DIG. 1 X |

FOREIGN PATENT DOCUMENTS

WO90/01180 2/1990 WIPO .

*Primary Examiner*—Kevin P. Shaver
*Attorney, Agent, or Firm*—Fay, Sharpe, Beall, Fagan, Minnich & McKee

[57] ABSTRACT

A toner cartridge dispenses toner for a printing apparatus. The cartridge comprises a housing having an internal cavity and a series of openings through a sidewall of the housing. An axially reciprocating slide includes a series of openings that are selectively aligned with the housing openings to discharge toner from the cavity. An agitating mechanism operates within the cavity and in response to paper advancement through the printing apparatus to facilitate discharge of toner from the cartridge.

34 Claims, 2 Drawing Sheets

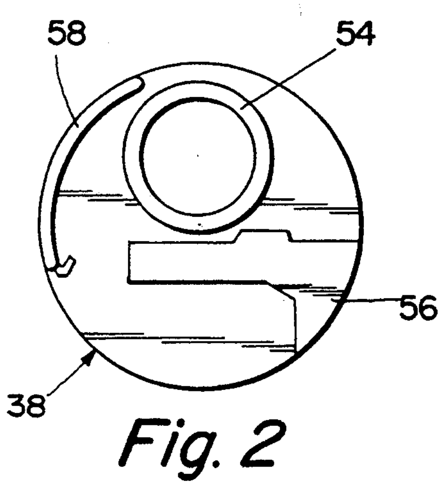
Fig. 2
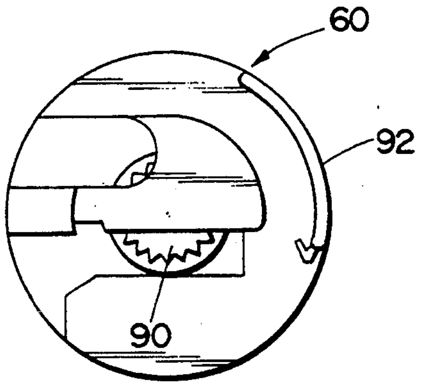
Fig. 3
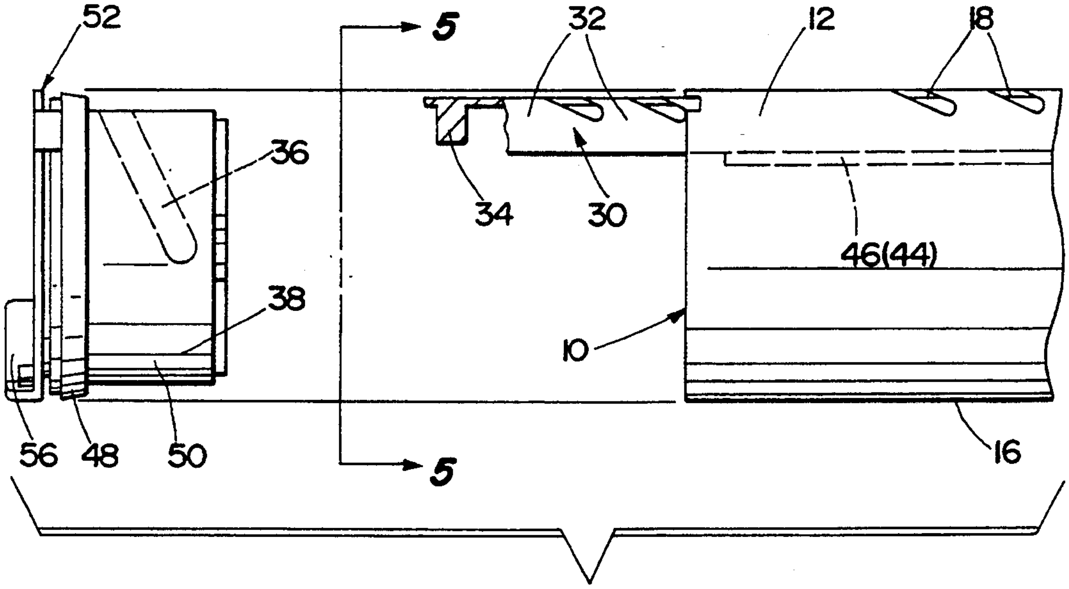
Fig. 4
Fig. 5
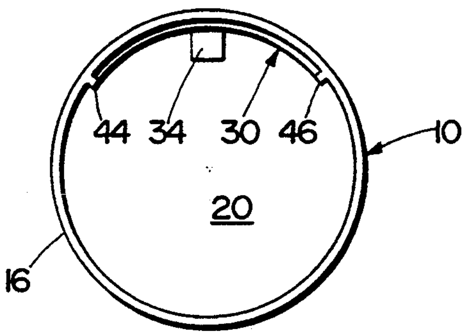

CARTRIDGE WITH SLIDE MECHANISM FOR DISPENSING TONER

BACKGROUND OF THE INVENTION

This invention pertains to the art of dispensing apparatus, and more particularly to a cartridge for dispensing toner. The invention is applicable to a replaceable toner cartridge for a printing apparatus, such as a laser printer, and will be described with particular reference thereto. However, it will be appreciated that the invention has broader applications and may be advantageously employed in other environments and applications.

A number of replaceable cartridges are known in the industry for dispensing toner to a printer or printing apparatus. As is known, paper has the toner fused to it so that after extensive use a new supply of toner is required. The toner is typically a black powder-like substance that is a mixture of particles which are eventually fused onto paper that passes through the printing apparatus. Because of the potential mess and cleanup associated with known arrangements for loading or dispensing toner into the printing apparatus, consumers prefer that the toner remain enclosed within the cartridge until the cartridge has been located within the printer for use.

By way of example, a known toner cartridge includes an elongated opening or series of openings that are covered by a removable tape. Once the tape is removed, the cartridge is then located so that the openings dispense the toner contained therein toward a reservoir or sump of the printing apparatus. A sufficient supply of toner is then ready for the printing operation. Although in widespread use, these types of cartridge are subject to inadvertent spilling of the toner since the cartridge opening(s), once the tape is removed, is exposed prior to locating the cartridge in the printing apparatus.

A more recent development in toner cartridges is the use of a pair of relatively rotatable cylinders. Each cylinder includes a set of openings that, when aligned, permit communication between an interior cavity and the toner reservoir of the printing apparatus. The dual cylinder cartridge arrangement permits an operator to place the cartridge into the printer and after it is properly located, the inner cylinder is rotated to align the openings and dispense the toner. By way of example, U.S. Pat. No. 5,118,013 describes a toner cartridge of this general type. Although this type of cartridge does address some of the problems with prior arrangements, it, too, requires the use of more intricate parts that correspondingly increase the manufacture and assembly costs associated therewith.

Still another concern with known cartridge arrangements is the ability to agitate the toner to facilitate distribution from the cartridge. Oftentimes, instructions associated with loading a toner cartridge require a user to rock, shake, or otherwise manually agitate the toner cartridge. Moreover, if the printer provides a low toner indication, the operator is instructed to remove the cartridge, shake the remaining toner contents, and reinsert the cartridge prior to replacement. No automated agitation or distribution of the toner is provided by the cartridge structure.

Accordingly, it has been desired to provide a toner cartridge that is simple in construction, has low manufacturing assembly costs, prevents inadvertent spillage of the toner by maintaining the cartridge in a closed position until operatively located in the printer, and efficiently and effectively agitates the toner to provide continued and even distribution.

SUMMARY OF THE INVENTION

The present invention contemplates a new and improved toner cartridge that overcomes all of the above-referenced problems and others and provides a simple, economical arrangement.

According to the subject invention, there is provided a cartridge for dispensing toner having a housing with an internal cavity that holds the toner. At least one opening is provided through the housing through which the toner is dispensed. A slide is operatively associated with the housing opening for dispensing the toner from the cavity. Means for selectively axially moving the slide between open and closed positions is provided.

According to a more limited aspect of the invention, an agitating means is incorporated into the cartridge to facilitate dispensing of the toner.

According to still another aspect of the invention, the slide and agitating means operate independently of one another.

A principal advantage of the invention is the provision of a slide mechanism that covers and exposes toner discharge openings to dispense toner when desired.

Another advantage of the invention resides in the agitating mechanism that evenly dispenses toner through the discharge openings.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 2 is an elevational view of a first end cap taken generally from the left-hand end of FIG. 1;

FIG. 3 is an elevational view of a second end cap taken generally from the right-hand end of FIG. 1;

FIG. 4 is an elevational view of the partly assembled cartridge with selected portions shown in cross-section, as viewed generally along the lines 4—4 of FIG. 1; and, FIG. 5 is a cross-sectional view taken generally along the lines 5—5 of FIG. 4.

DETAILED DESCRIPTION OF THE PREFERRED EMBODIMENT

Figure 1:
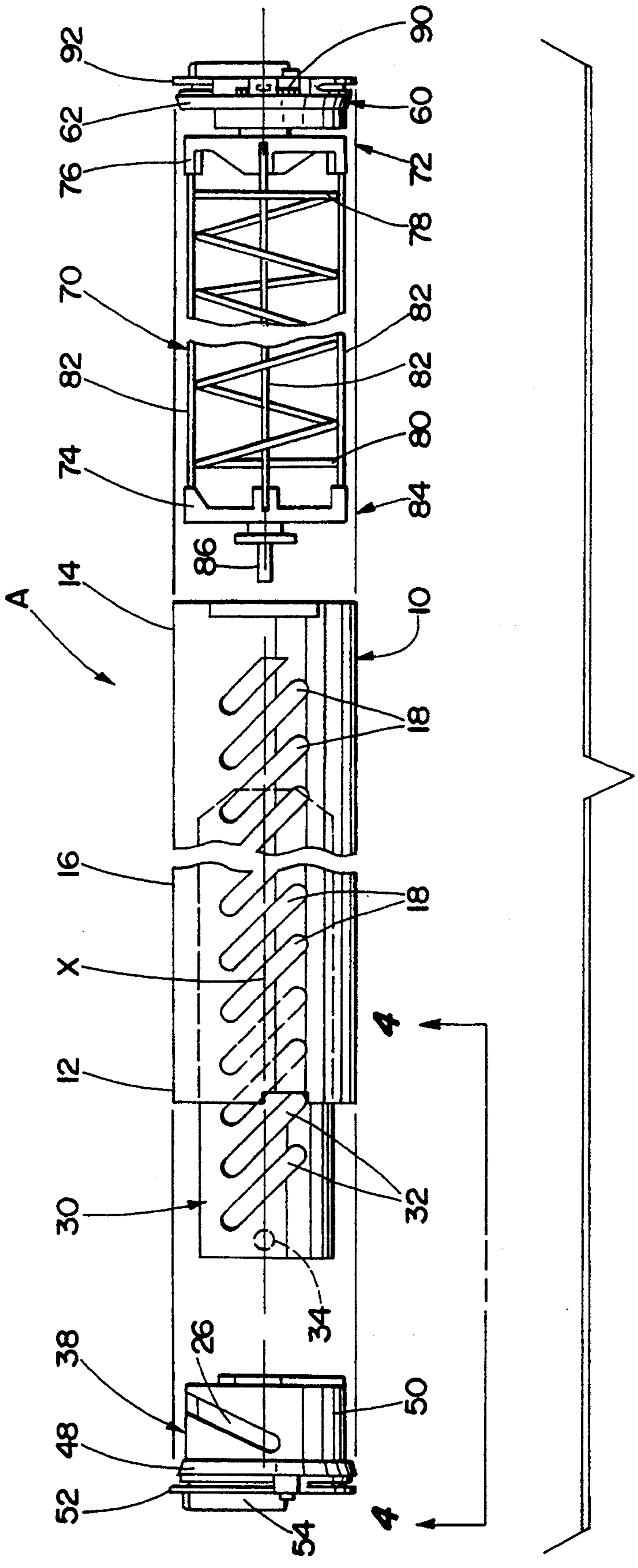
FIG. 1 is an exploded, schematic representation of the components of the subject new cartridge.

Referring now to the drawings wherein the showings are for purposes of illustrating the preferred embodiment of the invention only, and not for purposes of limiting same, the FIGURES show a cartridge A adapted to dispense toner to a printing apparatus such as a laser printer (not shown). More particularly, and with reference to FIGS. 1–4, the cartridge includes a generally cylindrical, elongated hollow housing 10 having a first end 12 and a second end 14 spaced apart along longitudinal axis "X". According to a preferred arrangement, the housing is a plastic construction comprised of a generally cylindrical sidewall 16 that has a series of openings 18 therein. The openings are axially spaced apart and extend in a generally helical fashion around a minor circumferential portion of the sidewall. As will be described in greater detail below, the openings permit a toner retained within an internal cavity 20 (FIG. 5) of the cartridge housing to be discharged into a reservoir area of a printer apparatus (not shown).

Disposed adjacent the sidewall openings 18 is a slide 30 which also has a series of openings 32 therethrough. Preferably, the slide openings 32 are similarly sized and spaced apart relative to the sidewall openings 18 so that when aligned with the sidewall openings the toner can pass freely from the interior cavity into the printing apparatus. The slide is elongated and adapted for selective axial movement relative to the housing sidewall whereby openings 32 are selectively aligned with openings 18 to permit the toner to be discharged from the container. As will be readily apparent, when the openings 18, 32 are non-aligned, the toner is maintained in the cavity and discharge or dispensing cannot take place. Thus, the slide is intended for movement between covered (closed) and exposed (open) positions relative to the housing sidewall.

The slide has an axial length generally comparable to that of the housing, but at least sufficiently shorter for selective alignment and non-alignment of the respective openings. Axial movement of the slide is provided through selective moving means preferably defined by a pin and slot arrangement. This arrangement includes a pin or tab 34 at one end of the slide, the pin 34 extending radially inward from the slide (FIGS. 4 and 5) for operative receipt in a slot 36 (FIGS. 1 and 4). The slot 36 is formed in a first end cap 38 shown at the left-hand end of FIGS. 1 and 4. The slot has a generally helical configuration that extends approximately 90° about the periphery of the end cap although similar arrangements can be used without departing from the scope and intent of the subject invention. Upon rotation of the end cap relative to the housing sidewall, the pin rides within the slot and axially reciprocates the slide between open and closed positions, selectively positioning the openings 18, 32 as desired. Guide ribs 44, 46 (FIG. 5) extend radially inward from the housing sidewall, capturing opposite, longitudinal edges of the slide so that it can only move axially relative to the housing. Moreover, the slide has a generally arcuate cross-sectional configuration that mates with the inner circumferential configuration of the housing sidewall.

The first end cap 38 is also a plastic construction that allows the first end cap to rotate relative to the housing sidewall without using any additional bearing structure. The first end cap includes a shoulder 48 that may incorporate a foam seal to retain the toner within the housing cavity while permitting selective rotation between the end cap and housing. The slot 36 extends axially inward into the housing on a cam region 50 while suitable grooves and ribs 52 are provided on the axially opposite or outer side of the shoulder 48 to mount the cartridge within a printer apparatus. Additionally, a removable cap 54 (FIG. 2) may be provided to cover an opening through the end cap which provides access to fill the cavity with toner if desired. Flanges 56, 58 aid in locating the cartridge in an associated printing apparatus. Accordingly, the particular configuration of the flanges can vary depending on the structural arrangement of the support on the printing apparatus.

The opposite end 14 of the housing is closed by a second end cap 60. The second end cap also is preferably a plastic construction and includes a shoulder 62 that closely fits within the housing. It, too, may include a foam seal or other sealing arrangement to retain the toner within the cavity. Extending axially inward from the second end cap is an agitating means 70, a first end 72 of which is mounted for rotation relative to the second end cap. A pair of retaining discs 74, 76 are axially spaced apart and receive opposite ends of a pair of helical wire springs 78, 80. Additionally, a series of wire tie rods 82 are circumferentially spaced and comprise a portion of the agitating means, opposite ends of the tie rods also being received in the discs. The discs, tie rods, and wire springs define a cage assembly that agitates the toner along substantially the entire length and cross-section of the cartridge. A second end 84 of the agitating means includes a pin 86 that is centrally received in cam region 50. As will be understood, the pin has a clearance fit with a corresponding central opening in the cam portion to permit rotation of the agitating means relative to the first end cap. The pin, when fully seated in the central opening in the cam portion, will secure the end caps 38 and 60 via the agitating means.

The agitating means is driven at its first end 72 by a gear 90 (FIGS. 1 and 3) which cooperates with a drive gear (not shown) associated with the printing apparatus. Additionally, suitable mounting structure 92 is provided on the second end cap to secure the opposite end of the housing in the printing apparatus.

In its normal, non-operative position, the slide is positioned by the pin and slot arrangement so that the openings 18, 32 are not aligned and toner discharge is precluded. Upon insertion of the cartridge into a printing apparatus orienting the sidewall openings 18 toward the toner reservoir of the printing apparatus, a thumb wheel or other suitable actuating structure permits rotation of the first end cap relative to the remainder of the housing. This rotation moves the slide in an axial direction so that the openings 18, 32 become aligned and toner is discharged from the cartridge. It is expected that the slide will remain in the open position while retained within the printer apparatus, and will move to a closed position when it is desired to remove the cartridge therefrom. Of course, it will be understood that the slide can be reciprocated at other times if so desired.

The agitating means is selectively driven through gear 90 to facilitate discharge and dispensing of the toner from the aligned openings. It is contemplated that the agitating means will be driven by the gear arrangement for rotation as paper is fed through the printing apparatus. Again, though, alternative arrangements can be used to drive the agitating means as desired.

The preferred arrangement described above offers many features and advantages lacking in prior devices. The toner cartridge uses a rotatable end cap to activate the toner discharge mechanism, i.e., the slide. The slide is not intended to repeatedly reciprocate while mounted in the printing apparatus. This, of course, decreases wear and tear on the components since the subject invention is intended to maintain the sidewall openings exposed when the cartridge is located in the printing apparatus. Moreover, the slide and cam mechanism are located within the housing sidewall so that a certain amount of protection from damage during shipping and handling is prevented. Further, the mechanism for exposing and covering the openings and the mechanism for agitating the toner are integral with the cartridge.

Although not shown, it will be understood that the sidewall openings can also be covered by a tape. Preferably, the tape is secured by an adhesive to the sidewall.

The tape would add the additional benefit of containing any toner that may inadvertently pass through the openings during shipping and handling. The tape may be removed prior to a subsequent to insertion into the printer.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A cartridge adapted to dispense toner for a printing apparatus, the cartridge comprising:

a generally elongated hollow housing closed at opposite ends by first and second end caps and defining therewith an internal cavity adapted to hold toner therein, the housing including at least one opening therethrough that communicates with the cavity for selectively dispensing toner to the printing apparatus;

a slide disposed adjacent the housing for selectively covering and exposing the housing opening to dispense toner from the cavity; and, means for selectively axially moving the slide between covered and exposed positions in response to rotation of the first end cap relative to the housing.

2. The cartridge as defined in claim 1 wherein the at least one opening in the housing includes plural axially spaced openings for dispensing toner from the internal cavity.

3. The cartridge as defined in claim 1 wherein the slide includes at least one opening that cooperates with the at least one opening of the housing, the exposed position being defined by alignment of the housing and slide openings.

4. The cartridge as defined in claim 1 further comprising means for restraining the slide from rotating relative to the housing.

5. The cartridge as defined in claim 1 further comprising means for agitating toner in the housing cavity.

6. The cartridge as defined in claim 5 wherein the toner agitating means includes means for operating the toner agitating means independent of the position of the slide.

7. The cartridge as defined in claim 1 wherein the at least one opening in the housing includes plural, spaced openings extending in generally helical fashion on the housing.

8. The cartridge as defined in claim 7 wherein the slide includes generally helically oriented openings that are selectively aligned with the housing openings.

9. The cartridge as defined in claim 1 wherein the slide moving means includes a generally helical slot in the first end cap that receives a pin extending from the slide for axially reciprocating the slide in response to rotation of the first end cap relative to the housing.

10. The cartridge as defined in claim 1 wherein the housing is substantially cylindrical and receives the slide therein, the housing being maintained stationary once it is loaded into the printing apparatus and the first end cap rotated to locate the slide in the exposed position after the cartridge has been loaded into the printing apparatus.

11. The cartridge as defined in claim 10 wherein the second end cap includes means for actuating a toner agitating means.

12. The cartridge as defined in claim 11 wherein the toner agitating means includes a cage assembly that extends substantially the full length of the housing.

13. A cartridge for selectively dispensing toner to an associated printer apparatus, the cartridge comprising:

an elongated hollow housing having a generally cylindrical sidewall and first and second end caps closing opposite ends of the sidewall and defining a cavity, openings formed in the sidewall communicating with the cavity;

a slide disposed adjacent the sidewall openings and including openings that are selectively aligned therewith to permit passage of toner from the cavity through the slide and housing;

means for axially reciprocating the slide and selectively aligning the openings in the housing and slide; and, a cage assembly disposed in the cavity and adapted for rotation relative to the sidewall to agitate toner in the cavity.

14. The cartridge as defined in claim 13 wherein the openings in the housing and slide are generally helically oriented and extend over limited circumferential portions of the housing and slide, respectively.

15. The cartridge as defined in claim 13 wherein the cage assembly includes a drive member that extends through one of the first and second end caps for selectively rotating the cage assembly in response to a driving member on the printing apparatus.

16. The cartridge as defined in claim 13 wherein the slide is located in the cavity adjacent the housing sidewall.

17. The cartridge as defined in claim 13 wherein the cage assembly rotates in response to feeding paper through the printing apparatus.

18. The cartridge as defined in claim 17 wherein the cage assembly rotates independently of the slide.

19. The cartridge as defined in claim 18 wherein the cage assembly is operatively driven by a drive member extending through the second end cap, the cage assembly being rotated relative to the sidewall when paper is fed through the printing apparatus.

20. The cartridge as defined in claim 19 wherein the slide is operatively associated with the first end cap, the slide reciprocating means including a pin and slot arrangement in the slide and first end cap that axially moves the slide in response to rotation of the first end cap relative to the sidewall.

21. A cartridge for selectively dispensing toner to an associated printer apparatus, the cartridge comprising:

an elongated hollow housing having a generally cylindrical sidewall and first and second end caps closing opposite ends of the sidewall and defining a cavity, openings formed in the sidewall communicating with the cavity;

a slide disposed adjacent the sidewall openings and including openings that are selectively aligned therewith to permit passage of toner from the cavity through the slide and housing;

a cooperating pin and slot arrangement for reciprocating the slide and selectively aligning the openings in the housing and slide, one of the pin and slot being defined in the first end cap and the other of the pin and slot being defined in the slide; and an agitator for stirring toner in the cavity.

22. The cartridge as defined in claim 21 further comprising means for preventing the slide from rotating relative to the housing.

23. The cartridge as defined in claim 2 wherein the first end cap includes the slot of the cooperating pin and slot arrangement that has a generally helical configuration that receives the pin extending from the slide for axially reciprocating the slide in response to rotation of the first end cap relative to the housing.

24. A cartridge adapted to dispense toner for a printing apparatus, the cartridge comprising:

a generally elongated hollow housing closed at opposite ends by first and second end caps and defining therewith an internal cavity adapted to hold toner therein, the housing including at least one opening therethrough that communicates with the cavity for selectively dispensing toner to the printing apparatus;

a slide disposed adjacent the housing for selectively covering and exposing the housing opening to dispense toner from the cavity; and, an actuator member that selectively axially moves the slide between covered and exposed positions in response to rotation of the first end cap relative to the housing.

25. The cartridge as defined in claim 24 wherein the at least one opening in the housing includes plural axially spaced openings for dispensing toner from the internal cavity.

26. The cartridge as defined in claim 24 wherein the slide includes at least one opening that cooperates with the at least one opening of the housing, the exposed position being defined by alignment of the housing and slide openings.

27. The cartridge as defined in claim 24 further comprising a guide member to prevent the slide from rotating relative to the housing.

28. The cartridge as defined in claim 24 further comprising an agitator for stirring toner in the housing cavity.

29. The cartridge as defined in claims 28 wherein the agitator operates independent of the position of the slide.

30. The cartridge as defined in claim 29 wherein the at least one opening in the housing includes plural, spaced openings extending in generally helical fashion on the housing.

31. The cartridge as defined in claim 30 wherein the slide includes generally helically oriented openings that are selectively aligned with the housing openings.

32. The cartridge as defined in claim 26 wherein the housing is substantially cylindrical and receives the slide therein, the housing being maintained stationary once it is loaded into the printing apparatus and the first end cap rotated to locate the slide in the exposed position after the cartridge has been loaded into the printing apparatus.

33. The cartridge as defined in claim 32 wherein the second end cap includes an actuator for actuating a toner agitator.

34. The cartridge as defined in claim 33 wherein the toner agitator includes a cage assembly that extends substantially the full length of the housing.

* * * * *